US011925963B2

(12) United States Patent
Lee et al.

(10) Patent No.: US 11,925,963 B2
(45) Date of Patent: Mar. 12, 2024

(54) METHOD FOR TREATING A SUBSTRATE

(71) Applicant: SEMES CO., LTD., Cheonan-si (KR)

(72) Inventors: Kyeong Min Lee, Hwaseong-si (KR); Tae-Keun Kim, Suwon-si (KR); Min Hee Cho, Suwon-si (KR); Won Young Kang, Gimhae-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/826,729

(22) Filed: May 27, 2022

(65) Prior Publication Data

US 2023/0405645 A1 Dec. 21, 2023

(51) Int. Cl.
*B08B 7/00* (2006.01)
*B08B 3/10* (2006.01)

(52) U.S. Cl.
CPC .............. *B08B 7/0014* (2013.01); *B08B 3/10* (2013.01)

(58) Field of Classification Search
None
See application file for complete search history.

(56) References Cited

U.S. PATENT DOCUMENTS

2020/0194281 A1* 6/2020 Yoshida ............ H01L 21/02057

FOREIGN PATENT DOCUMENTS

| | | | |
|---|---|---|---|
| JP | 2015-119164 | A | 6/2015 |
| JP | 2016-213252 | A | 12/2016 |
| JP | 2020-096141 | A | 6/2020 |
| JP | 2021-153140 | A | 9/2021 |
| KR | 101005889 | B1 | 1/2011 |
| KR | 10-2012-0117678 | A | 10/2012 |
| KR | 101509595 | B1 | 4/2015 |
| KR | 101874526 | B1 | 7/2018 |
| KR | 10-2018-0107172 | A | 10/2018 |
| KR | 10-2019-0136979 | A | 12/2019 |
| KR | 102315619 | B1 | 10/2021 |
| WO | WO-2020/004047 | A1 | 1/2020 |

OTHER PUBLICATIONS

Korean Office Action dated Feb. 9, 2023 issued in corresponding Korean Appln. No. 10-2020-0186290. 7 pages, not in English.
Japanese Office Action dated Mar. 20, 2023 issued in corresponding Japanese Appln. No. 2022-084220. 7 pages, not in English.

* cited by examiner

*Primary Examiner* — Eric W Golightly
(74) *Attorney, Agent, or Firm* — Harness, Dickey & Pierce, P.L.C.

(57) ABSTRACT

The inventive concept provides a substrate treating method. The substrate treating method includes supplying a dissolving solution onto a rotating substrate; and supplying, after the supplying a dissolution solution, a treating liquid including a polymer onto the rotating substrate to form a liquid film.

20 Claims, 12 Drawing Sheets

METHOD FOR TREATING A SUBSTRATE

TECHNICAL FIELD

Embodiments of the inventive concept described herein relate to a substrate treating method, and more specifically to a substrate treating method for liquid treating a substrate by supplying a liquid including a polymer to the substrate.

BACKGROUND

In order to manufacture a semiconductor device, various processes such as a photolithography process, a deposition process, an ashing process, an etching process, and an ion implantation process are performed. In addition, before and after these processes are performed, a cleaning process is performed to clean particles remaining on a substrate.

The cleaning process includes supplying a chemical to a substrate supported and rotated by a spin head, supplying a cleaning liquid such as a deionized water (DIW) to the substrate to remove the chemical from the substrate, and then supplying an organic solvent such as an isopropyl alcohol (IPA) liquid with a lower surface tension than the cleaning liquid to the substrate to replace the cleaning liquid on the substrate with the organic solvent, and removing a replaced organic solvent from the substrate.

In addition, the cleaning process may include a process of supplying a treating liquid including a polymer and a solvent onto the substrate. Once the solvent containing a volatile component is volatilized, the polymer is solidified due to a change in volume of the treating liquid and adsorbs particles. Thereafter, the polymer having adsorbed the particles is peeled off from the substrate by using deionized water, and then the substrate is cleaned again with an organic solvent such as an IPA.

At this time, when the treating liquid containing the solvent is supplied onto the substrate, the treating liquid may not sufficiently reach between fine patterns formed on the substrate, and thus the particles are not properly removed therefrom. To solve this problem, an amount of the treating liquid supplied may be increased, but this may cause a waste of the treating liquid and may not have a significant effect on removing the particles.

SUMMARY

Embodiments of the inventive concept provide a substrate treating method for improving a cleaning efficiency.

Embodiments of the inventive concept provide a substrate treating method for reducing an amount of a treating liquid used.

Embodiments of the inventive concept provide a substrate treating method for a treating liquid to pass through between a pattern formed on a substrate.

The technical objectives of the inventive concept are not limited to the above-mentioned ones, and the other unmentioned technical objects will become apparent to those skilled in the art from the following description.

The inventive concept provides a substrate treating method. The substrate treating method includes a supplying a dissolving solution onto a rotating substrate; and supplying, after the supplying a dissolution solution, a treating liquid including a polymer onto the rotating substrate to form a liquid film.

In an embodiment, the dissolution solution is supplied at a room temperature or higher.

In an embodiment, the dissolution solution is provided at a boiling temperature of the dissolution solution or lower.

In an embodiment, a rotation speed of the rotating substrate changes while the solution is supplied onto the rotating substrate.

In an embodiment, the rotation speed of the rotating substrate reduces stepwise while the dissolution solution is supplied onto the rotating substrate.

In an embodiment, a rotation speed of the rotating substrate gradually reduces while the dissolution solution is supplied onto the rotating substrate.

In an embodiment, the substrate treating method further comprises solidifying the liquid film by stopping the supply of the treating liquid while keeping the rotation of the substrate.

In an embodiment, the dissolution solution includes an organic solvent, and the polymer includes a resin.

The inventive concept provides a substrate treating method. The substrate treating method includes supplying a dissolution solution onto a rotating substrate; and supplying a treating liquid including a polymer onto the rotating substrate, wherein the dissolution solution includes an organic solvent.

In an embodiment, the supplying a dissolution solution comprises supplying the dissolution solution at a room temperature or higher and at a boiling temperature of the dissolution solution or lower.

In an embodiment, the rotating substrate is rotated at a second speed during the supplying a treating liquid, and at a first speed during the supplying the dissolution solution, and the second speed is faster than the first speed.

In an embodiment, during the supplying dissolution solution, a rotation speed of the rotating substrate reduces stepwise.

In an embodiment, during the supplying the dissolution solution, a rotation speed of the rotating substrate gradually reduces.

In an embodiment, the substrate treating method further comprises solidifying a liquid film of the treating liquid by stopping the supplying a treating liquid while keeping the rotating of the substrate.

In an embodiment, the substrate treating method further comprises, after solidifying a liquid film of the treating liquid: peeling the solidified liquid film from the substrate by supplying a peeling liquid onto the rotating substrate; supplying a rinsing liquid, after the peeling the solidified liquid film, onto the rotating substrate to clean a residue on the substrate; and drying the substrate by stopping the supplying a rinsing liquid while keeping the rotation of the substrate.

In an embodiment, the polymer includes a resin.

In an embodiment, the peeling liquid is a deionized water, and the rinsing liquid is an organic solvent.

The inventive concept provides a substrate treating method. The substrate treating method includes supplying a dissolution solution onto a rotating substrate; supplying a treating liquid including a polymer onto the rotating substrate to form a liquid film of the treating liquid; solidifying the liquid film by stopping the supplying a treating liquid while keeping the rotation of the substrate; supplying a peeling liquid on the rotating substrate to peel the solidified liquid film from the substrate supplying a rinsing liquid onto the rotating substrate to clean a residue on the substrate; and drying the substrate by stopping the supplying a rinsing liquid while keeping the rotation of the substrate, and wherein the polymer includes a resin and the solution is an organic solvent.

In an embodiment, during the supplying a treating liquid the substrate is rotated at a second speed, and during the supplying the dissolution solution the substrate is rotated at a first speed, and the second speed is faster than the first speed.

In an embodiment, during the supplying the dissolution solution, a rotation speed of the substrate reduces stepwise.

According to an embodiment of the inventive concept, a cleaning efficiency of a substrate may be improved.

According to an embodiment of the inventive concept, an amount of a treating liquid used may be reduced.

According to an embodiment of the inventive concept, a treating liquid may pass between a pattern formed on a substrate.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

Figure 1:
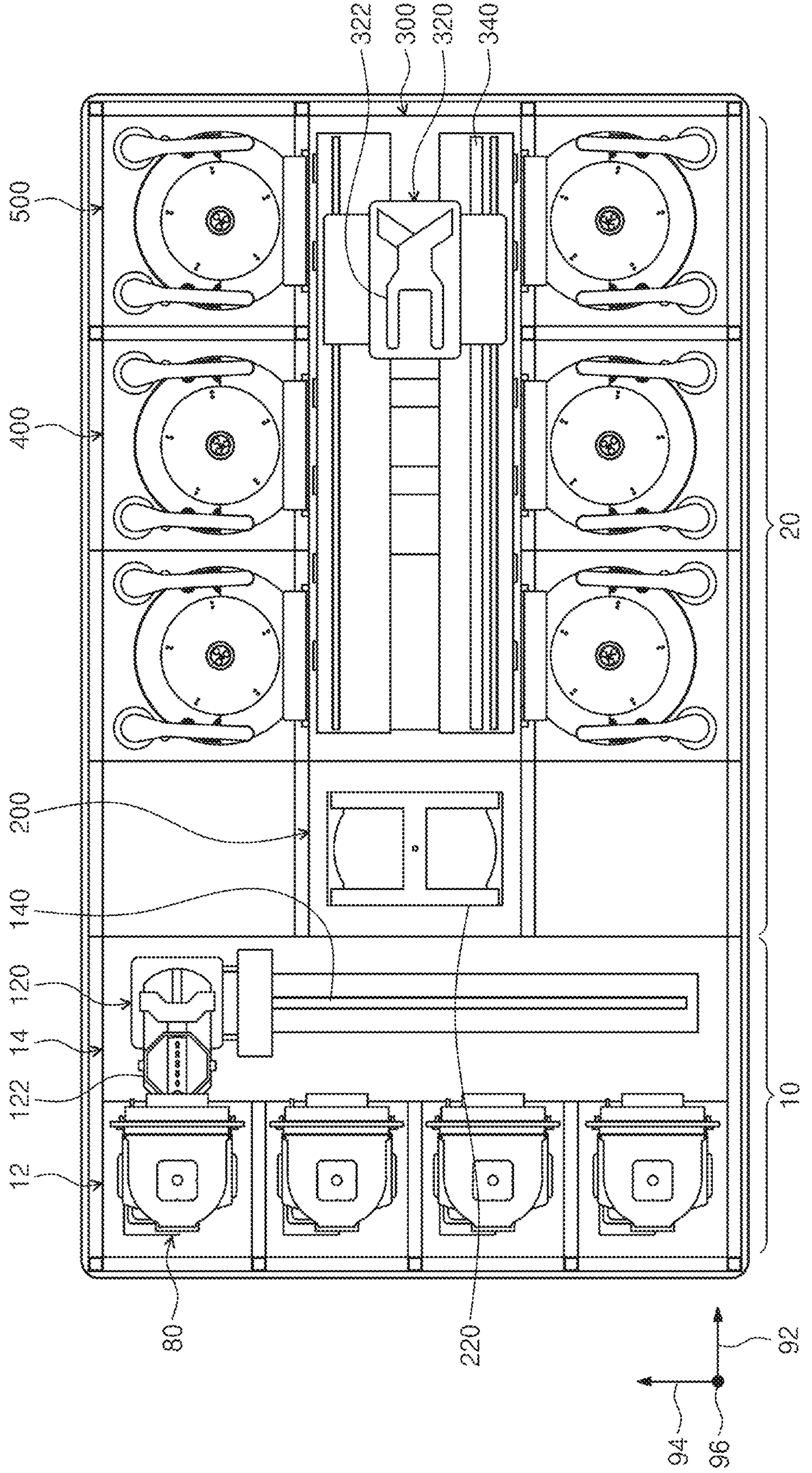
FIG. 1 is a plan view schematically illustrating a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms. The embodiment is provided to more fully explain the inventive concept to those with average knowledge in the art. Therefore, a form of the element in the drawing is exaggerated to emphasize a clearer description.

FIG. 1 is a plan view schematically illustrating a substrate treating apparatus according to an embodiment of the inventive concept. Referring to FIG. 1, the substrate treating apparatus includes an index module 10 and a treating module 20. According to an embodiment, the index module 10 and the treating module 20 are disposed in a direction. Hereinafter, the direction in which the index module 10 and the treating module 20 are disposed is referred to as a first direction 92, a direction perpendicular to the first direction 92 is referred to as a second direction 94, and a direction perpendicular to both the first direction 92 and the second direction 94 is referred to as a third direction 96.

The index module 10 transfers the substrate W from a container 80 in which the substrate is stored to the treating module 20 for a treating process, and stores a substrate W which has been treated at the treating module 20 to the container 80. A lengthwise direction of the index module 10 is provided in the second direction 94. The index module 10 has a load port 12 and an index frame 14. The load port 12 and the treating module 20 are disposed at two opposite sides of the index module 14. The container 80 in which the substrates W are stored is placed on the load port 12. The load port 12 may be provided in a plurality, and the plurality of load ports 12 may be disposed in the second direction 94.

A sealed container such as a front open unified pod (FOUP) may be used as the container 80. The container 80 may be placed on the load port 12 by a transfer means (not shown) such as an overhead transfer, an overhead conveyor, or an automatic guided vehicle, or by an operator.

The index frame 14 is provided with an index robot 120. A guide rail 140 with its lengthwise direction provided in the second direction 94 may be provided within the index frame 14, and the index robot 120 may be provided to be movable along the guide rail 140. The index robot 120 may include a hand 122 on which the substrate W is placed, and the hand 122 may be provided to be forwardly and backwardly movable, rotatable with the third direction 96 as an axis, and movable along the third direction 96. The hand 122 may provided in a plurality and spaced apart in an up/down direction, and the hands 122 may be forwardly and backwardly movable independently of each other.

The treating module 20 includes a buffer unit 200, a transfer chamber 300, and a liquid treating chamber 400. The buffer unit 200 provides a space in which a substrate W taken into the treating module 20 and a substrate W taken out from the treating module 20 temporarily stays. The liquid treating chamber 400 supplies a liquid onto the substrate W to perform a liquid treating process for liquid treating the substrate W. The transfer chamber 300 transfers the substrate W between the buffer unit 200 and the liquid treating chamber 400.

The transfer chamber 300 may be provided with its lengthwise direction in the first direction 92. The buffer unit 200 may be disposed between the index module 10 and the transfer chamber 300. The liquid treating chamber 400 may be disposed on a side of the transfer chamber 300. The liquid treating chamber 400 and the transfer chamber 300 may be disposed in the second direction 94. The buffer unit 200 may be positioned at an end of the transfer chamber 300 adjacent the buffer unit 200.

According to an embodiment, the liquid treating chambers 400 may be disposed on both sides of the transfer chamber 300, and at a side of the transfer chamber 300 the liquid treating chambers 400 may be provided in an arrangement of A×B (A, B is a natural number greater than 1 or 1), respectively, in the first direction 92 and the third direction 96.

The transfer chamber 300 has a transfer robot 320. A guide rail 340 provided with its lengthwise direction in the first direction 92 may be provided within the transfer chamber 300, and the transfer robot 320 may be provided to be movable along the guide rail 340. The transfer robot 320 includes a hand 322 on which the substrate W is placed, and the hand 322 may be forwardly and backwardly movable, rotatable with the third direction 96 as an axis, and movable along the third direction 96. The hand 322 may be provided in a plurality to be spaced apart in the up/down direction, and the hands 322 may be forwardly and backwardly movable independently of each other.

The buffer unit 200 includes a plurality of buffers 220 on which the substrate W is placed. The buffers 220 may be disposed to be spaced apart from each other along the third direction 96. A front face and a rear face of the buffer unit 200 are opened. The front face is a surface facing the index module 10, and the rear face is a surface facing the transfer chamber 300. The index robot 120 may access the buffer unit 200 through the front face, and the transfer robot 320 may access the buffer unit 200 through the rear face.

Figure 2:
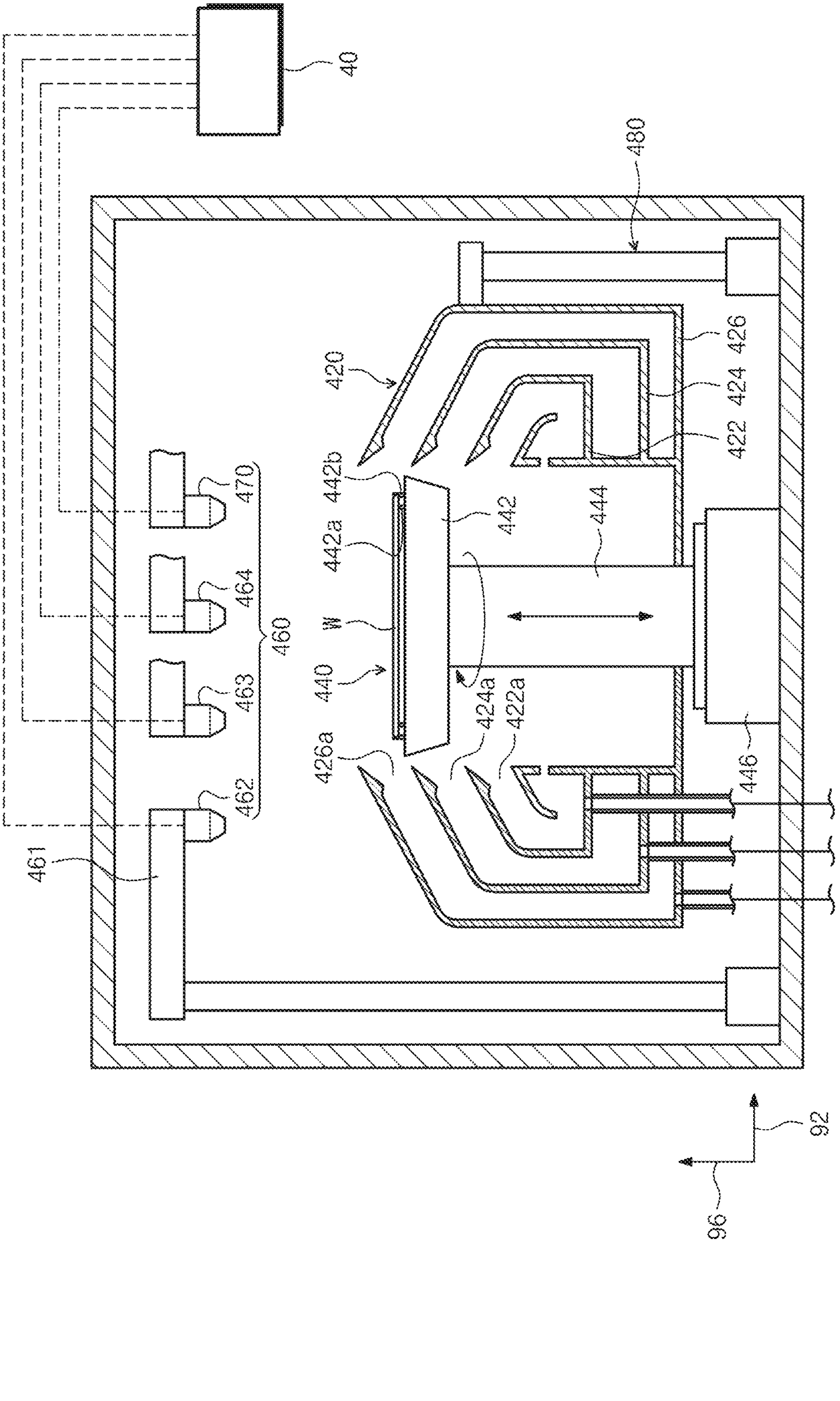
FIG. 2 schematically illustrates an embodiment of a liquid treating chamber of FIG. 1.

FIG. 2 schematically illustrates an embodiment of the liquid treating chamber 400 of FIG. 1. Referring to FIG. 2, the liquid treating chamber 400 includes a housing 410, a cup 420, a support unit 440, a liquid supply unit 460 and a lifting/lowering unit 480.

The housing 410 is provided in a substantially rectangular parallelepiped shape. The cup 420, the support unit 440, and the liquid supply unit 460 are disposed within the housing 410.

The cup 420 has a treating space with an open top, and the substrate W is liquid-treated within the treating space. The support unit 440 supports the substrate W within the treating space. The liquid supply unit 460 supplies a liquid onto the substrate W supported by the support unit 440. The liquid may be provided in a plurality of types and is sequentially supplied onto the substrate W. The lifting/lowering unit 480 adjusts a relative height between the cup 420 and the support unit 440.

According to an embodiment, the cup 420 has a plurality of recollecting containers 422, 424, and 426. Each of the recollecting containers 422, 424, and 426 has a recollecting space for recollecting a liquid used for a substrate treating. Each of the recollecting containers 422, 424, and 426 are provided in a ring shape surrounding the support unit 440. When the liquid treating process is performed, a treating liquid scattered by a rotation of the substrate W flows into a recollecting space through the inlets 422*a*, 424*a*, and 426*a* of each of the recollecting containers 422, 424, and 426.

According to an embodiment, the cup 420 has a first recollecting container 422, a second recollecting container 424, and a third recollecting container 426. The first recollecting container 422 is disposed to surround the support unit 440, the second recollecting container 424 is disposed to surround the first recollecting container 422, and the third recollecting container 426 is disposed to surround the second recollecting container 424. The second inlet 424*a* through which a liquid flows into the second recollecting container 424 may be located above the first inlet 422*a* through which a liquid flows into the first recollecting container 422, and the third inlet 426*a* through which a liquid flows into the third recollecting container 426 may be located above the second inlet 424*a*.

The support unit 440 has a support plate 442 and a drive shaft 444. A top surface of the support plate 442 is generally provided in a circular shape and may have a diameter larger than that of the substrate W. A support pin 442*a* for supporting a bottom surface of the substrate W is provided at a center of the support plate 442, and the support pin 442*a* is provided such that a top end thereof protrudes from the support plate 442 so that the substrate W is spaced apart from the support plate 442 by a predetermined distance.

A chuck pin 442*b* is provided at an edge of the support plate 442. The chuck pin 442*b* is provided to upwardly protrude from the support plate 442, and supports a side of the substrate W so that the substrate W is not separated from the support unit 440 when the substrate W is rotated. The drive shaft 444 is driven by the driver 446, is connected to a center of a bottom surface of the substrate W, and rotates the support plate 442 on its central axis.

The lifting/lowering unit 480 moves the cup 420 in the up/down direction. A relative height between the cup 420 and the substrate W is changed by the up/down movement of the cup 420. Accordingly, since the recollecting containers 422, 424, and 426 for recollecting a treating liquid are changed according to a type of liquid supplied to the substrate W, the liquid may be separately recollected. Unlike described above, the cup 420 is fixedly installed, and the lifting/lowering unit 480 may move the support unit 440 in the up/down direction.

Referring to FIG. 2, the inventive concept may include a liquid supply unit 460 and a controller 40 controlling the liquid supply unit 460. The liquid supply unit 460 includes a solution supply nozzle 463, a peeling liquid supply nozzle 462, a rinsing liquid supply nozzle 464, and a treating liquid of the inventive concept supply nozzle 470. In an embodiment, the solution supply nozzle 463, the peeling liquid supply nozzle 462, the rinsing liquid supply nozzle 464, and the treating liquid supply nozzle 470 may be supported by a different arm 461. Selectively, the solution supply nozzle 463, the peeling liquid supply nozzle 462, the rinsing liquid supply nozzle 464, and the treating liquid supply nozzle 470 may be supported by a same arm 461.

The solution supply nozzle 463 supplies a solution onto the substrate W supported by the support unit 440. According to an embodiment, the solution is a liquid that dissolves a polymer to be described later. According to an embodiment, the solution is an organic solvent. According to an embodiment, the solution may be provided with any one of an isopropyl alcohol (IPA), a thinner, a butanol, a propylene glycol methyl ether (PGME), a methyl isobutyl carbinol (MIBC), or combinations thereof.

The peeling liquid supply nozzle 462 discharges a peeling liquid onto the substrate W. According to an embodiment, the peeling liquid contains a deionized water. The peeling liquid applies a physical impact to a treating liquid film formed on the substrate W to peel the liquid film from the substrate W.

The rinsing liquid supply nozzle 464 discharges the rinsing liquid onto the substrate W. In an embodiment, the rinsing liquid includes a liquid dissolving a polymer. According to an embodiment, the rinsing liquid contains an organic solvent. According to an embodiment, the rinsing liquid may be provided with any one of an isopropyl alcohol (IPA), a thinner, a butanol, a propylene glycol methyl ether (PGME), a methyl isobutyl carbinol (MIBC), or combinations thereof.

In the above-described example, it has been described that the solution supply nozzle 463 and the rinsing liquid supply nozzle 464 are separately provided. However, unlike this, the solution supply nozzle 463 and the rinsing liquid supply nozzle 464 may be provided as a single nozzle which supplies both the solution and the rinsing liquid.

The treating liquid supply nozzle 470 supplies a treating liquid including a polymer onto the substrate W, thereby forming a liquid film on the substrate W. The treating liquid includes a polymer and a solvent. The polymer includes a resin. The resin may be an acrylic resin, a phenol resin, etc. The treating liquid is a liquid in which the polymer is dissolved in the solvent. When the treating liquid (the liquid film) on the substrate W is dried, the solvent evaporates and the remaining polymer on the substrate W is solidified to form a solidified polymer film (solidified liquid film).

Figure 3:
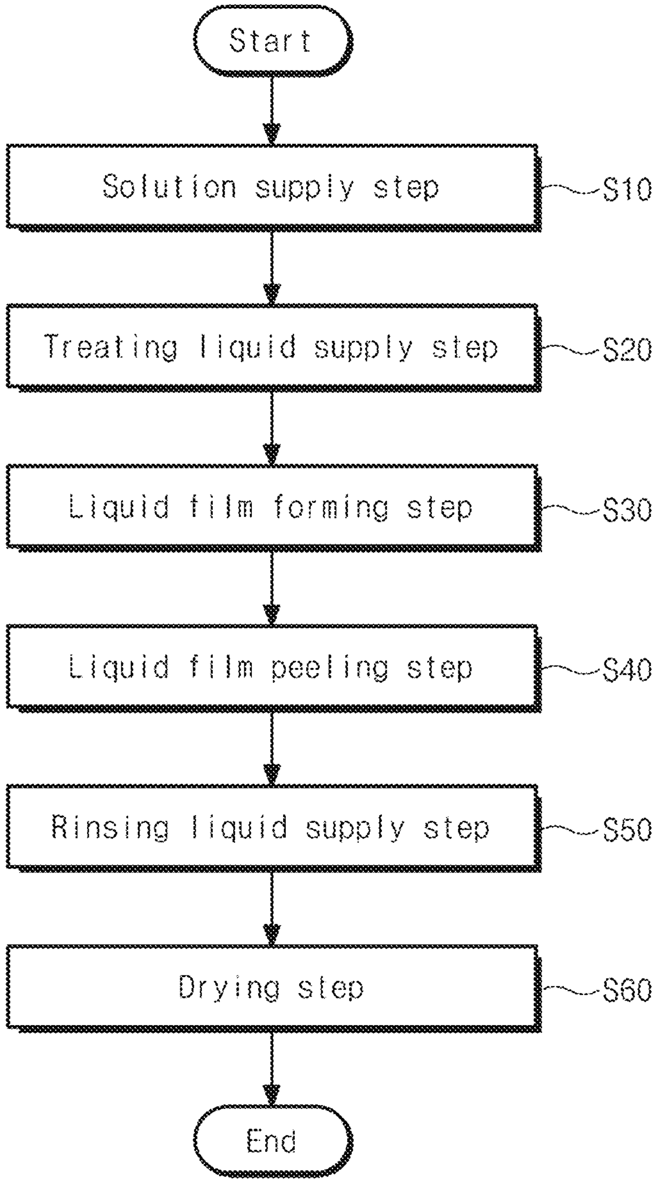
FIG. 3 is a flow chart of a substrate treating method of the inventive concept.

Hereinafter, a substrate treating method according to the inventive concept will be described with reference to FIG. 3 to FIG. 19. FIG. 3 is a flowchart of the substrate treating method of the inventive concept, and FIG. 4 to FIG. 19 each sequentially illustrate a substrate W treated according to the substrate treating method of the inventive concept. Referring to FIG. 3, the substrate treating method of the inventive concept includes a solution supply step S10, a treating liquid supply step S20, a liquid film solidifying step S30, a liquid film peeling step S40, a rinsing liquid supply step S50, and a drying step S60.

Figure 4:
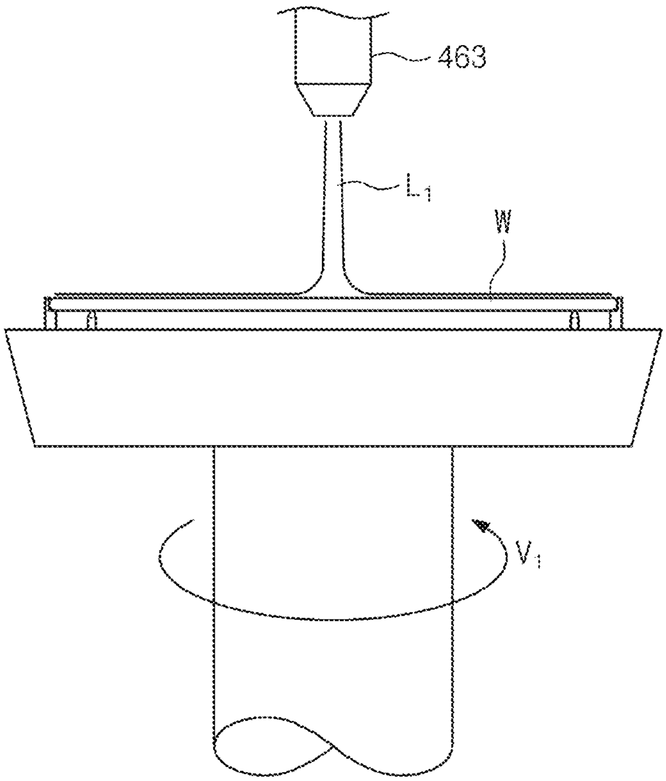
FIG. 4 to FIG. 19 each sequentially illustrate a state of treating a substrate according to the substrate treating method and a state of a treated substrate according to the substrate treating method of the inventive concept.
Figure 5:
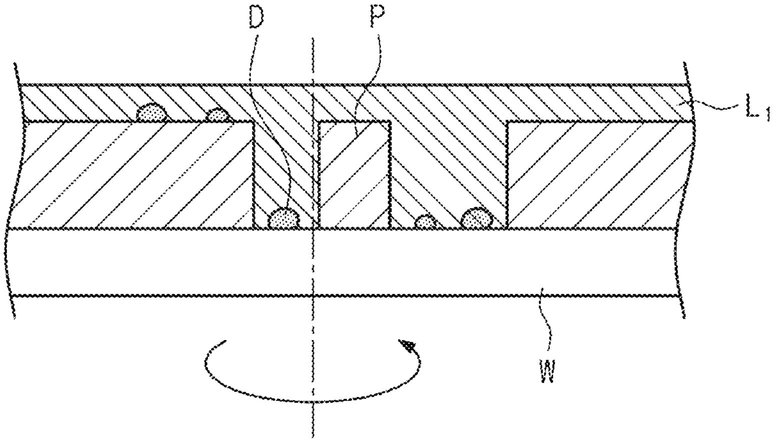

FIG. 4 shows a state of supplying the solution L1 onto a rotating substrate W in the dissolution solution supply step S10, and FIG. 5 shows a state of the substrate W to which the dissolution solution L1 is supplied. In an embodiment, the dissolution solution L1 supply nozzle 463 supplies the dissolution solution L1 to a central region of the substrate W. By a rotation of the substrate W, the dissolution solution L1 spreads from the central region to an edge region of the substrate W. The dissolution solution L1 wets the substrate W as a whole. In addition, as shown in FIG. 5, a wetting liquid reaches between patterns P formed on the substrate W.

Figure 6:
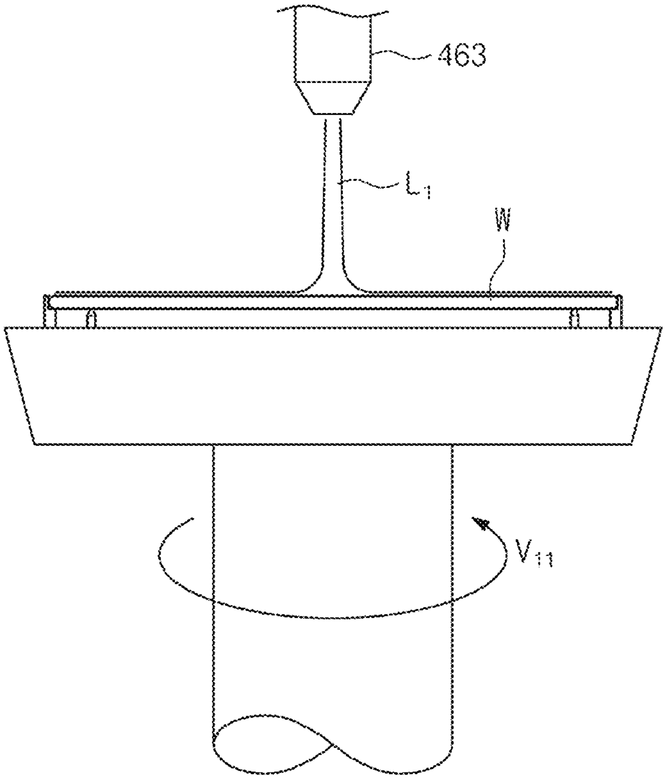
Figure 7:
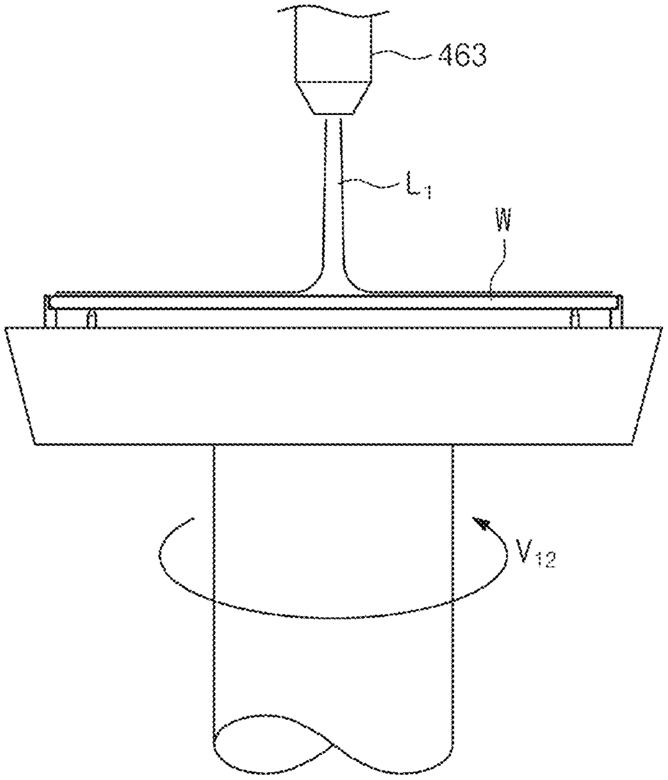

In an embodiment, in the dissolution solution supply step S10, the substrate W is rotated at a first speed V1. Hereinafter, the first speed V1 will be described as an average value of a rotation speed of the substrate W while the dissolution solution supply step S10 is performed. According to an embodiment, while supplying the dissolution solution L1 onto the substrate W, the rotation speed of the substrate W may be changed. For example, during the dissolution solution supply step S10, the rotation speed of the substrate W may be stepwise reduced. For example, during the dissolution solution supply step S10, the substrate W is rotated at a speed of V11 for a first time period as shown in FIG. 6. After the first time period, the substrate W is rotated at a speed of V12, which is slower than the speed of V11 for the second time period, as shown in FIG. 7. In an embodiment, an average speed for the first and second time period is the first speed V1. In an embodiment, the first time period longer than the second time period. In some embodiments, while supplying the dissolution solution L1 onto the substrate W, the rotation speed of the substrate W may be gradually reduced.

As the rotation speed of the substrate W is reduced in the dissolution solution supply step S10, a drying of the dissolution solution L1 on the substrate W is prevented. In an embodiment, the second time period may be a time period (e.g., ready-for period) required for replacing a nozzle to perform the treating liquid supply step S20. Namely, the ready-for period for replacing the nozzle where the supply of the dissolution solution is stopped can be utilized to block the dissolution liquid from being dried by decreasing the rotation speed of the substrate.

In an embodiment, the dissolution solution L1 is provided at a high temperature. For example, the dissolution solution L1 may be provided at a room temperature or higher. However, the dissolution solution L1 is provided at a temperature of the boiling point of the dissolution solution L1 or lower. Accordingly, the dissolution solution L1 is prevented from evaporating on the substrate W.

After the dissolution solution supply step S10, the treating liquid supply step S20 begins.

Figure 8:
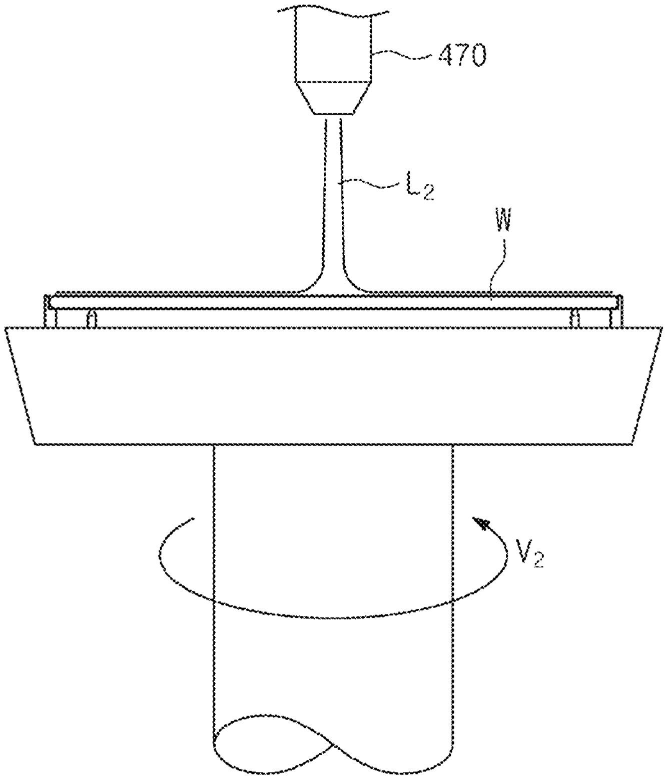
Figure 9:
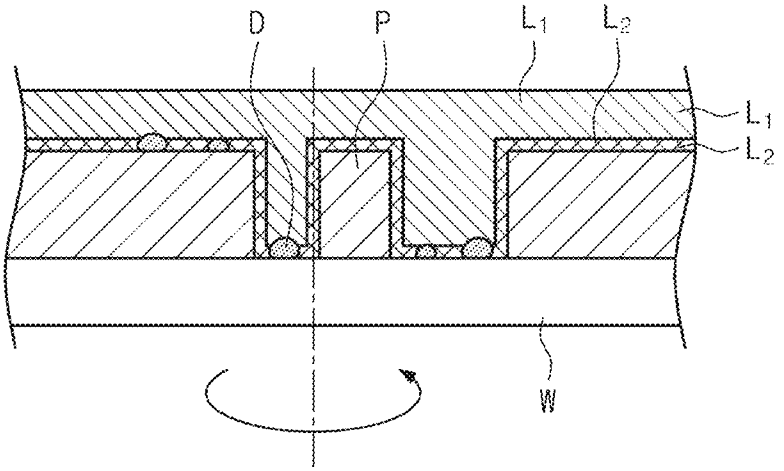

FIG. 8 shows a state of supplying the treating liquid L2 onto the rotating substrate W in the treating liquid supply step S20. FIG. 9 shows a state in which the treating liquid L2 is supplied to the substrate W which has been supplied with the dissolution solution L1, and FIG. 10 shows a state in which the polymer within the treating liquid L2 is dissolved in the dissolution solution L1.

In the treating liquid supply step S20, as shown in FIG. 8, the treating liquid L2 is supplied onto the rotating substrate W. In an embodiment, the treating liquid L2 supply nozzle 470 supplies the treating liquid L2 to the central region of the substrate W. By the rotation of the substrate W, the treating liquid L2 spreads from the central region to the edge region of the substrate W. As shown in FIG. 9, the treating liquid L2 is supplied onto the substrate W to which the dissolution solution L1 has been supplied. As the treating liquid L2 is supplied onto the substrate W, as shown in FIG. 9, the polymer in the treating liquid L2 is dissolved in the dissolution solution L1. Since the substrate W is pre-wetted by the dissolution solution L1, the treating liquid L2 easily spreads to an entire surface of the substrate W. As the dissolution solution L1 has already reached and wetted the space between the patterns P, the treating liquid L2 easily reaches between the patterns P due to the dissolution solution L1. Accordingly, there is an advantage that an amount of the treating liquid L2 required to supply the treating liquid L2 on the entire surface of the substrate W and between the pattern P is less than an amount of the treating liquid L2 required to directly supply the treating liquid L2 to the substrate W without supplying the solution L1. In addition, the dissolution solution L1 includes an organic solvent capable of dissolving the polymer of the treating liquid L2, so that the treating liquid L2 may more easily reaches the entire surface of the substrate W and between the patterns P. According to an embodiment, in the treating liquid supply step S20 the substrate W may be rotated at the second speed V2, in the solution supply step S10 the substrate W may be rotated at the first speed V1, and the second speed V2 may faster than the first speed V1. Accordingly, as described above, an excessive evaporation of the solution L1 at the solution supply step S10 may be prevented.

Figure 10:
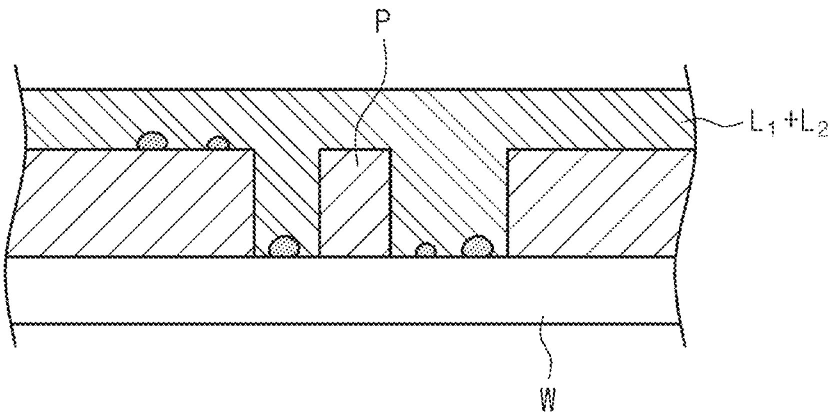

When the treating liquid L2 is supplied on the substrate W, as illustrated in FIG. 10, a liquid film including the solution L1 and the polymer is formed on the substrate W. When the treating liquid L2 is supplied, the polymer included in the treating liquid L2 is dissolved in the dissolution solution L1 and adsorbs the particles D on the substrate W. Accordingly, the particles D positioned between the pattern P are captured by the treating liquid L2.

Figure 11:
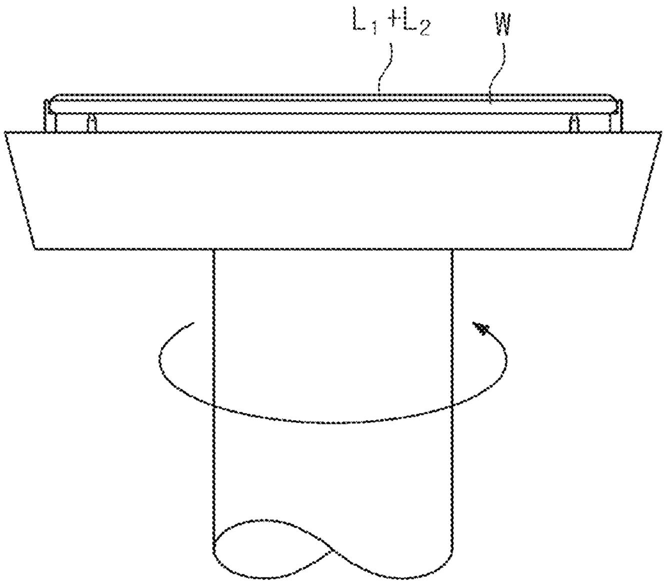
Figure 12:
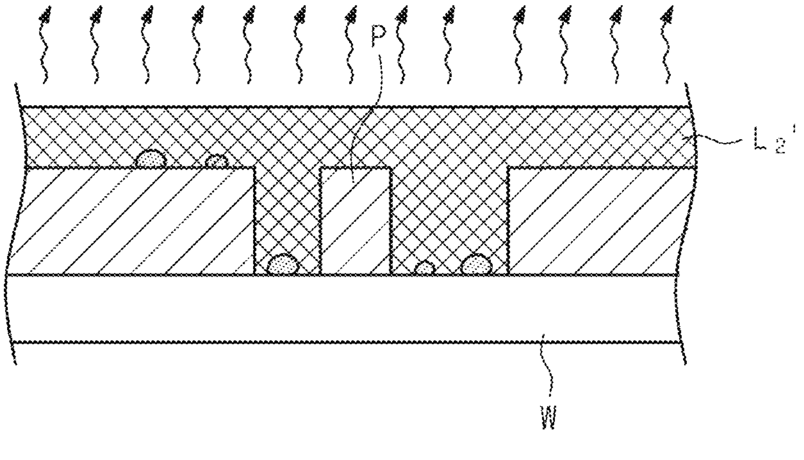

After the treating liquid supply step S20, the liquid film solidifying step S30 starts. FIG. 11 illustrates a state in which the substrate W is rotated at the liquid film solidifying step S30, and FIG. 12 illustrates a state in which the solvent within the treating liquid L2 on the substrate W is evaporated at the liquid film solidifying step S30. In the liquid film solidifying step S30, the solvent within the treating liquid L2 is evaporated and the treating liquid L2 is solidified on the substrate W. As shown in FIG. 12, the particles D are captured (immobilized) in the solidified treating liquid L2' (solidified liquid film). In an embodiment, as shown in FIG. 11, in the liquid film solidifying step S30, the substrate W is rotated while a treating liquid supply onto the substrate W is stopped. In an embodiment, the rotation speed of the substrate W in the liquid film solidifying step S30 is provided equal to the rotation speed of the substrate W in the treating liquid supply step S20. In some embodiments, in the liquid film solidifying step S30, the rotation speed of the substrate W is slower or faster than the rotation speed of the substrate W in the treating liquid supply step S20. As described above, in the liquid film solidifying step S30 a volatilization of the solvent may be promoted due to the heated dissolution solution L1. In an embodiment, in the liquid film solidifying step S30, the substrate W may be heated to promote a volatilization of the solvent.

Figure 13:
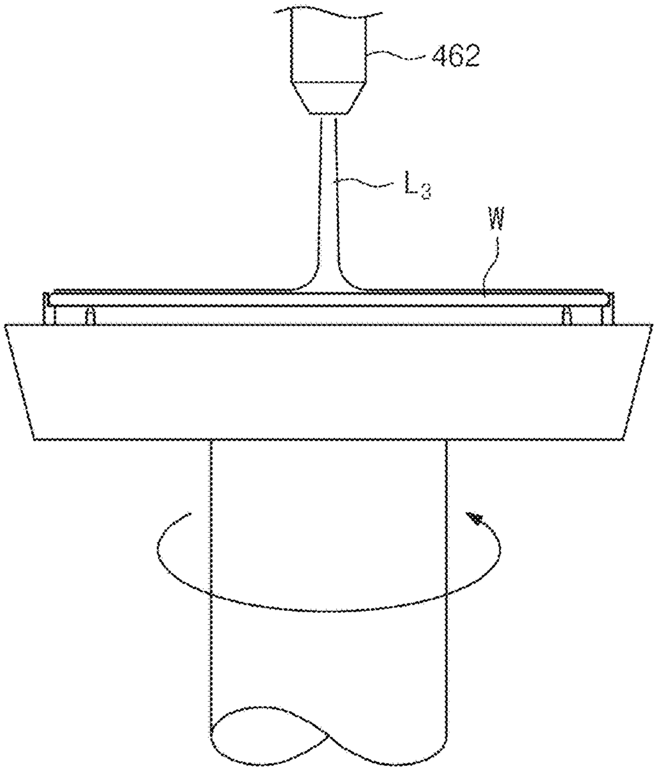
Figure 14:
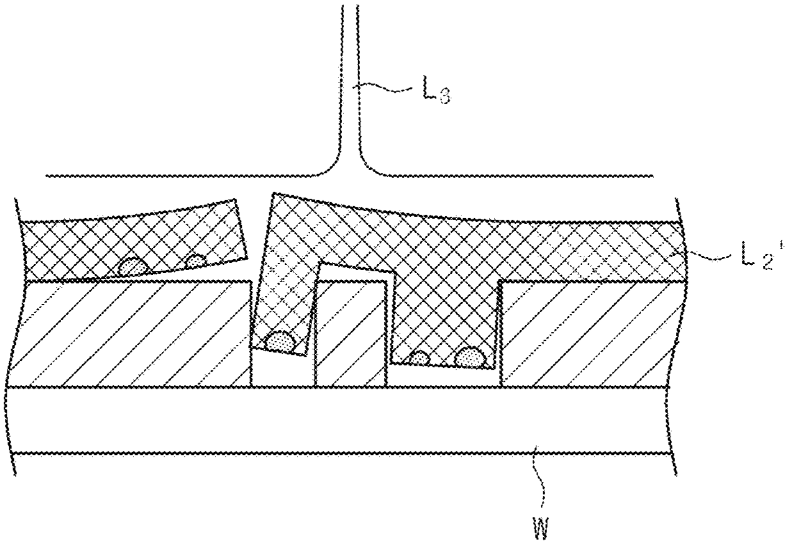

After the liquid film solidifying step S30, the solidified liquid film peeling step S40 is performed. FIG. 13 shows a state in which the peeling liquid L3 is supplied onto the substrate W in the solidified liquid film peeling step S40, and FIG. 14 shows a state in which the solidified treating liquid L2' on the substrate W is peeled in the solidified liquid film peeling step S40. As shown in FIG. 13, in the solidified liquid film peeling step S40, the peeling liquid L3 is supplied onto the rotating substrate W to peel the solidified treating liquid L2' on the substrate W together with the particles D on the substrate W. In an embodiment, the peeling liquid L3 supply nozzle 462 supplies the peeling liquid L3 to the central region of the substrate W. By the rotation of the substrate W, the peeling liquid L3 spreads from the central region to the edge region of the substrate W. The particles D attached to a pattern P forming surface of the substrate W are peeled off from the substrate W together with the solidified treating liquid L2'. The peeling liquid L3 applies a physical force to the solidified treating liquid L2' so that the solidified treating liquid L2 is separated from the substrate W.

Figure 15:
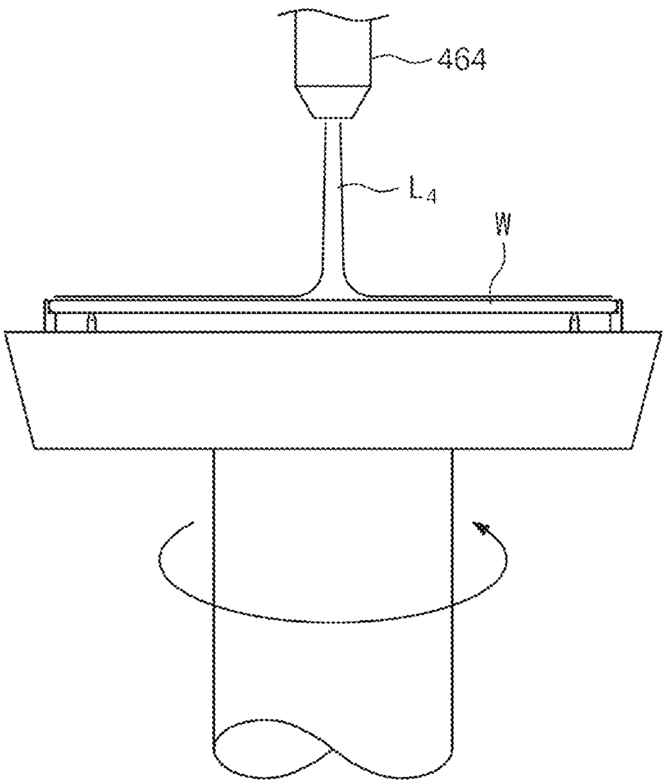
Figure 16:
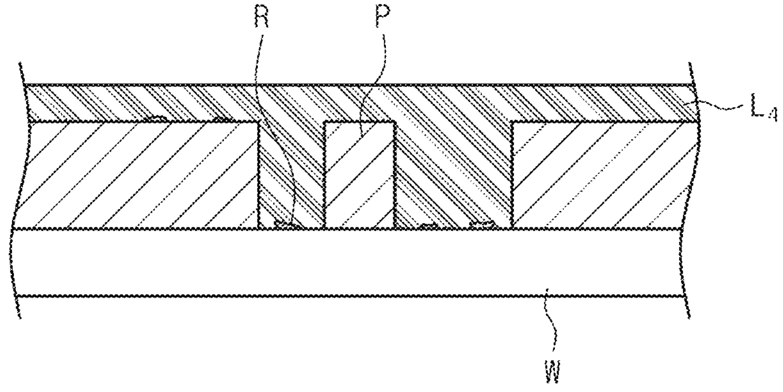

After the solidified liquid film peeling step S40, a rinsing liquid supply step S50 is performed. FIG. 15 shows a state in which the rinsing liquid L4 is supplied onto the substrate W in the rinsing liquid supply step S50, and FIG. 16 shows a state in which the rinsing liquid L4 is supplied onto the substrate W.

As shown in FIG. 15, in the rinsing liquid supply step S50, the rinsing liquid L4 is supplied onto the rotating substrate W by the rinsing liquid L4 supply nozzle 464 in order to remove a residue remaining on the substrate W. Even if the substrate W is cleaned by supplying the peeling liquid L3 in the solidified liquid film peeling step S40, foreign substances may remain on the substrate W as shown in FIG. 16. Accordingly, the rinsing liquid L4 is supplied onto the substrate W to remove the residue. In an embodiment, the rinsing liquid L4 supply nozzle 464 supplies the rinsing liquid L4 to the central region of the substrate W. By the rotation of the substrate W, the rinsing liquid L4 spreads from the central region to the edge region of the substrate W, thereby removing the residue.

Figure 17:
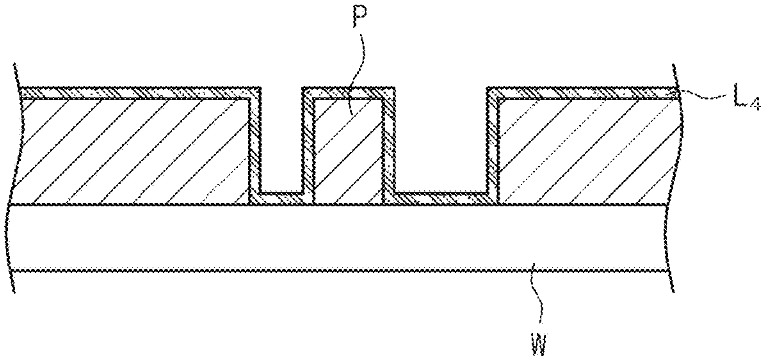
Figure 18:
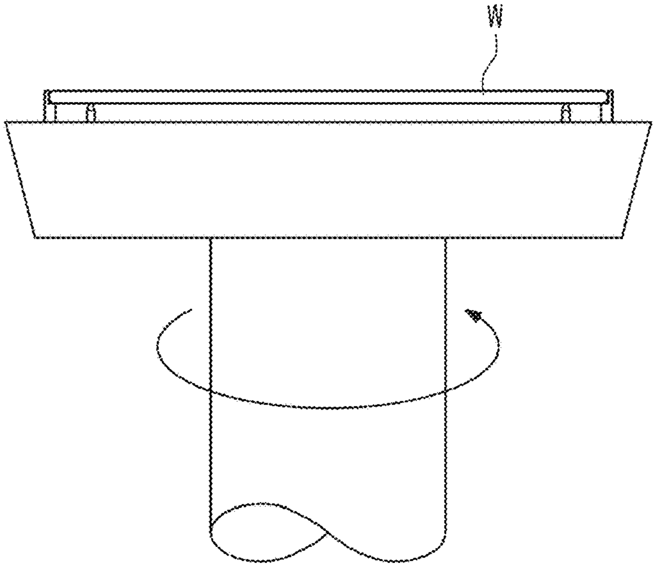
Figure 19:
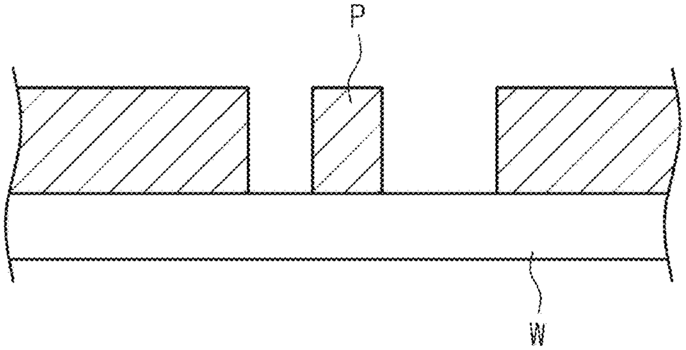

After the rinsing liquid supply step S50, the drying step S60 is performed. FIG. 17 illustrates a state of the substrate W after the rinsing liquid supply step S50, FIG. 18 illustrates a state of rotating the substrate W in the drying step S60, and FIG. 19 illustrates a state of the substrate W after the drying step S60. As shown in FIG. 17, the rinsing liquid L4 supplied onto the substrate W in the rinsing liquid supply step S50 removes the residue, but the rinsing liquid L4 itself may remain on the substrate W. Accordingly, in the drying step S60, the rinsing liquid L4 remaining on the substrate W is dried. In an embodiment, in the drying step S60, as illustrated in FIG. 18, the substrate W is rotated in a state in which a liquid (e.g., a cleaning liquid) supply is stopped on the substrate W. When the drying step S60 is completed, as shown in FIG. 19, the substrate W is cleaned without any material remaining between the pattern P.

As described above, in each step, the substrate W is provided in a rotated state while a liquid is discharged. However, the substrate W may not rotate when a liquid is supplied.

As described above, it was instructed that each nozzle supplies a liquid from the central region of the substrate W onto the substrate W. However, selectively, an impact point of each nozzle may be changed between the central region of the substrate W and the edge region of the substrate W.

According to an embodiment of the inventive concept, there is an advantage that an organic solvent is first supplied onto the substrate W before the treating liquid including the polymer is supplied to the substrate W, thereby uniformly spreading the treating liquid on an entire surface of the substrate W to pass between the pattern of the substrate W. Accordingly, there is an advantage in that an amount of treating liquid used may be reduced.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating method comprising:

supplying a dissolution solution onto a rotating substrate; and supplying, after the supplying a dissolution solution, a treating liquid including a polymer onto the rotating substrate to form a liquid film, wherein the dissolution solution is provided at a boiling temperature of the dissolution solution.

2. The substrate treating method of claim 1, wherein a rotation speed of the rotating substrate changes while the dissolution solution is supplied onto the rotating substrate.

3. The substrate treating method of claim 2, wherein the rotation speed of the rotating substrate reduces stepwise while the dissolution solution is supplied onto the rotating substrate.

4. The substrate treating method of claim 1, wherein a rotation speed of the rotating substrate gradually reduces while the dissolution solution is supplied onto the rotating substrate.

5. The substrate treating method of claim 1, further comprising solidifying the liquid film by stopping the supply of the treating liquid while keeping the rotation of the substrate.

6. The substrate treating method of claim 1, wherein the dissolution solution includes an organic solvent, and the polymer includes a resin.

7. A substrate treating method comprising:

supplying a dissolution solution onto a rotating substrate; and supplying a treating liquid including a polymer onto the rotating substrate, wherein the dissolution solution includes an organic solvent, and wherein the dissolution solution is provided at a boiling temperature of the dissolution solution.

8. The substrate treating method of claim 7, wherein the rotating substrate is rotated at a second speed during the supplying a treating liquid, and at a first speed during the supplying the dissolution solution, and the second speed is faster than the first speed.

9. The substrate treating method of claim 7, wherein during the supplying dissolution solution, a rotation speed of the rotating substrate reduces stepwise.

10. The substrate treating method of claim 7, wherein during the supplying the dissolution solution, a rotation speed of the rotating substrate gradually reduces.

11. The substrate treating method of claim 7, further comprising:

solidifying a liquid film of the treating liquid by stopping the supplying a treating liquid while keeping the rotating of the substrate.

12. The substrate treating method of claim 11, further comprising, after solidifying a liquid film of the treating liquid:

peeling the solidified liquid film from the substrate by supplying a peeling liquid onto the rotating substrate;

supplying a rinsing liquid, after the peeling the solidified liquid film, onto the rotating substrate to clean a residue on the substrate; and drying the substrate by stopping the supplying a rinsing liquid while keeping the rotation of the substrate.

13. The substrate treating method of claim 12, wherein the polymer includes a resin.

14. The substrate treating method of claim 12, wherein the peeling liquid is a deionized water, and the rinsing liquid is an organic solvent.

15. A substrate treating method comprising:

supplying a dissolution solution onto a rotating substrate;

supplying a treating liquid including a polymer onto the rotating substrate to form a liquid film of the treating liquid;

solidifying the liquid film by stopping the supplying a treating liquid while keeping the rotation of the substrate;

supplying a peeling liquid on the rotating substrate to peel the solidified liquid film from the substrate;

supplying a rinsing liquid onto the rotating substrate to clean a residue on the substrate; and drying the substrate by stopping the supplying a rinsing liquid while keeping the rotation of the substrate, wherein the polymer includes a resin and the solution is an organic solvent, and wherein the dissolution solution is provided at a boiling temperature of the dissolution solution or lower.

16. The substrate treating method of claim 15, wherein during the supplying a treating liquid the substrate is rotated at a second speed, and during the supplying the dissolution solution the substrate is rotated at a first speed, and the second speed is faster than the first speed.

17. The substrate treating method of claim 15, wherein during the supplying the dissolution solution, a rotation speed of the substrate reduces stepwise.

18. The substrate treating method of claim 16, wherein each of the dissolution solution, the treating liquid, the peeling liquid, and the rinsing liquid are supplied from a same arm.

19. The substrate treating method of claim 18, wherein the dissolution solution dissolves the polymer included in the treating liquid.

20. The substrate treating method of claim 19, wherein the dissolution solution and the treating liquid are supplied to a central region of the substrate.

* * * * *